United States Patent
Yamamoto et al.

(10) Patent No.: US 8,900,739 B2
(45) Date of Patent: Dec. 2, 2014

(54) ELECTRODE LAYERED PRODUCT FOR CELL AND METHOD FOR MAKING THE SAME

(75) Inventors: Takahiko Yamamoto, Obu (JP);
Teruhiko Kameoka, Okazaki (JP);
Katsunori Kubota, Anjo (JP)

(73) Assignee: Denso Corporation, Kariya (JP)

( * ) Notice: Subject to any disclaimer, the term of this patent is extended or adjusted under 35 U.S.C. 154(b) by 291 days.

(21) Appl. No.: 13/134,466

(22) Filed: Jun. 8, 2011

(65) Prior Publication Data

US 2011/0305938 A1 Dec. 15, 2011

(30) Foreign Application Priority Data

Jun. 10, 2010 (JP) ................................. 2010-132628

(51) Int. Cl.
*H01M 4/00* (2006.01)
*H01M 2/18* (2006.01)
*H01M 10/04* (2006.01)

(52) U.S. Cl.
CPC ...... *H01M 10/0454* (2013.01); *H01M 10/0459* (2013.01); *Y02E 60/122* (2013.01)
USPC ........... 429/144; 429/128; 429/142; 429/146; 429/147

(58) Field of Classification Search
None
See application file for complete search history.

(56) References Cited

U.S. PATENT DOCUMENTS

| 4,889,777 | A  | * | 12/1989 | Akuto ........................... 429/162 |
| 6,794,800 | B1 | * | 9/2004  | Heinz ........................... 310/366 |
| 2007/0120205 | A1 | * | 5/2007 | Murata et al. ................ 257/414 |
| 2010/0245964 | A1 | * | 9/2010 | Mizuno ...................... 359/223.1 |

FOREIGN PATENT DOCUMENTS

| JP | 7-335244 | | 12/1995 | |
| JP | 9-17441  | | 1/1997  | |
| JP | 09-17441 | * | 1/1997 | ............ H01M 10/04 |
| JP | 2003-45474 | | 2/2003 | |

* cited by examiner

*Primary Examiner* — Barbara Gilliam
*Assistant Examiner* — Angela Martin
(74) *Attorney, Agent, or Firm* — Harness, Dickey & Pierce, PLC

(57) ABSTRACT

An electrode layered product for a cell includes a first electrode plate having a shape of a strip, a first separator having a shape of a strip, a second separator having a shape of a strip, a second electrode plate having a pectinate, tooth shape, and a third electrode plate having a pectinate, tooth shape. The first separator is stacked on one surface of the first plate. The second separator is stacked on the other surface of the first plate. The second plate is stacked on an opposite side of the first separator from the first plate. The second plate includes tooth sections and a joining section. The third plate is stacked on an opposite side of the second separator from the first plate. The third plate includes tooth sections and a joining section. The first and second separators and the first, second and third plates are bent in a zigzag manner.

14 Claims, 10 Drawing Sheets

ELECTRODE LAYERED PRODUCT FOR CELL AND METHOD FOR MAKING THE SAME

CROSS REFERENCE TO RELATED APPLICATION

This application is based on and incorporates herein by reference Japanese Patent Application No. 2010-132628 filed on Jun. 10, 2010.

BACKGROUND OF THE INVENTION

1. Field of the Invention

The present invention relates to an electrode layered product for a cell and to a method for making the product.

2. Description of Related Art

Conventionally, as an electrode layered product for a cell, there is an electrode integrated product for a sealed rectangular cell, which is disclosed in JP-A-H07-335244, for example. This electrode integrated product includes an electrode plate having a rectangular shape and a separator material in a tape form. More than one electrode plate are disposed on the separator material in the longitudinal direction. Another separator material is disposed on the electrode plate. The separator materials are thermal-compression bonded to each other, so that an electrode body is formed. Then, this electrode body is bent in a zigzag manner, and the electrode integrated product, in which the electrode plates are stacked, is thereby formed.

In the above-described electrode integrated product, the independent electrode plates need to be arranged on the separator material in the longitudinal direction. Accordingly, it takes some time to arrange the plates, so that productivity for the product decreases. Moreover, since the separate electrode plates are arranged in the longitudinal direction, misalignment between the electrode plates is easily caused at the time of their arrangement and at the time of bending the plates. It is therefore highly possible that a defect of shape of the product is caused.

SUMMARY OF THE INVENTION

The present invention addresses at least one of the above disadvantages.

According to the present invention, there is provided an electrode layered product for a cell. The electrode layered product includes a first electrode plate, a first separator, a second separator, a second electrode plate, and a third electrode plate. The first electrode plate has a shape of a strip. The first separator has a shape of a strip and is stacked on one surface of the first electrode plate. The second separator has a shape of a strip and is stacked on the other surface of the first electrode plate. The one surface and the other surface are located on opposite sides of the first electrode plate in a thickness direction of the first electrode plate. The second electrode plate has a pectinate, tooth shape and is stacked on an opposite side of the first separator from the first electrode plate. The second electrode plate includes a plurality of tooth sections and a joining section. The joining section joins together the plurality of tooth sections of the second electrode plate. The third electrode plate has a pectinate, tooth shape and is stacked on an opposite side of the second separator from the first electrode plate. The third electrode plate includes a plurality of tooth sections and a joining section. The joining section joins together the plurality of tooth sections of the third electrode plate. The first electrode plate, the first separator, the second separator, the second electrode plate, and the third electrode plate, which are stacked together, are bent in a zigzag manner.

According to the present invention, there is also provided a method for making an electrode layered product for a cell. According to the method, a first electrode plate that has a shape of a strip, a first separator that has a shape of a strip, a second separator that has a shape of a strip, a second electrode plate that has a pectinate, tooth shape, and a third electrode plate that has a pectinate, tooth shape, are provided. The second electrode plate includes a plurality of tooth sections and a joining section that joins together the plurality of tooth sections of the second electrode plate. The third electrode plate includes a plurality of tooth sections and a joining section that joins together the plurality of tooth sections of the third electrode plate. Furthermore, the first separator is stacked on one surface of the first electrode plate. The second separator is stacked on the other surface of the first electrode plate. The one surface and the other surface are located on opposite sides of the first electrode plate in a thickness direction of the first electrode plate. The second electrode plate is stacked on an opposite side of the first separator from the first electrode plate. The third electrode plate is stacked on an opposite side of the second separator from the first electrode plate. The first electrode plate, the first separator, the second separator, the second electrode plate, and the third electrode plate are bent in a zigzag manner.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
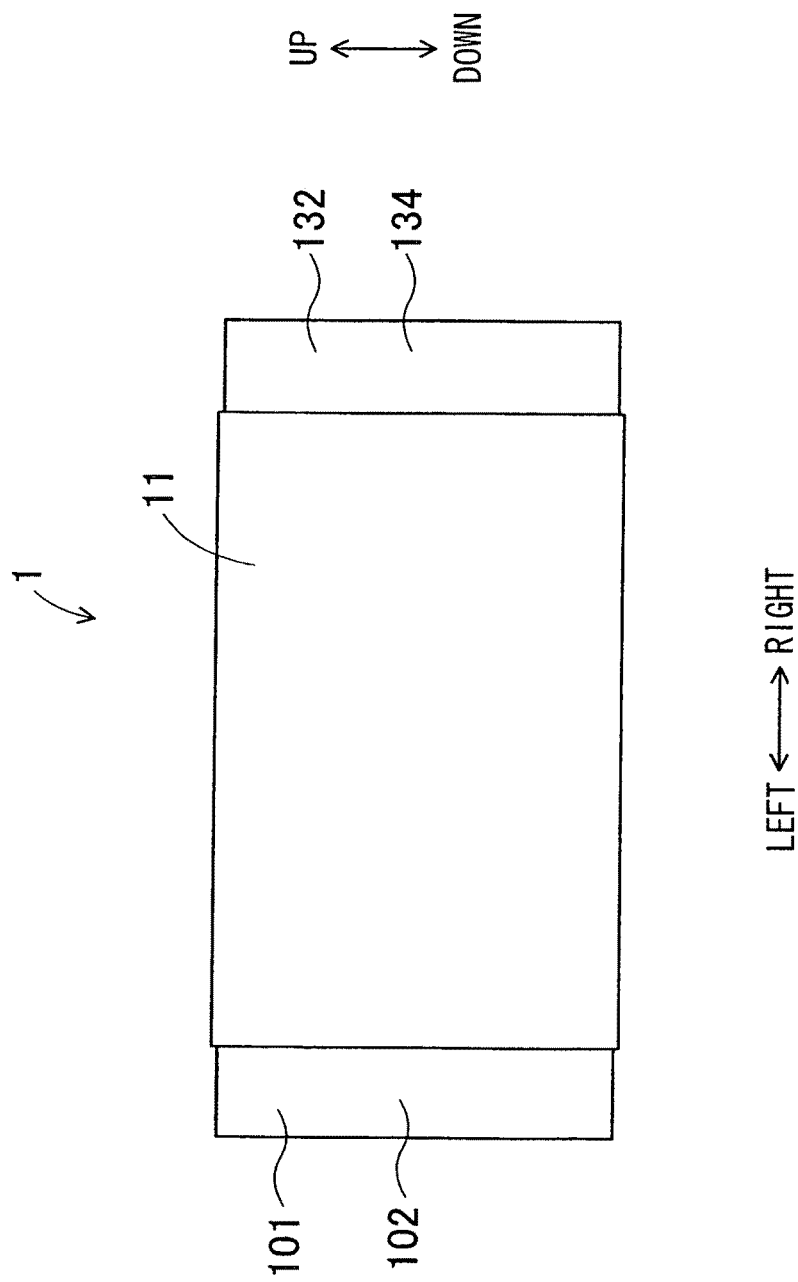
FIG. 1 is a front view illustrating an electrode layered product in accordance with an embodiment of the invention.

As a result of dedication to investigate and repetition of trial and error by the inventors to solve the above-described problems, it is found that, by stacking and bending beltlike and pectinate electrode plates to constitute an electrode layered product, an operating time for the product can be shortened so as to improve its productivity and a position misalignment of the electrode plate can be limited. Thus, the invention has been eventually achieved.

The invention will be described in detail using an embodiment of the invention. The present embodiment illustrates an example of application of an electrode layered product for a cell of the invention to an electrode layered product for a cell that is disposed in a vehicle to supply electricity to an electronic device.

Configuration of the electrode layered product will be described in reference to FIGS. 1 to 7C. A front-rear direction, an up-down direction, and a right-left direction in the drawings are indicated for greater convenience to distinguish between directions.

Figure 2:
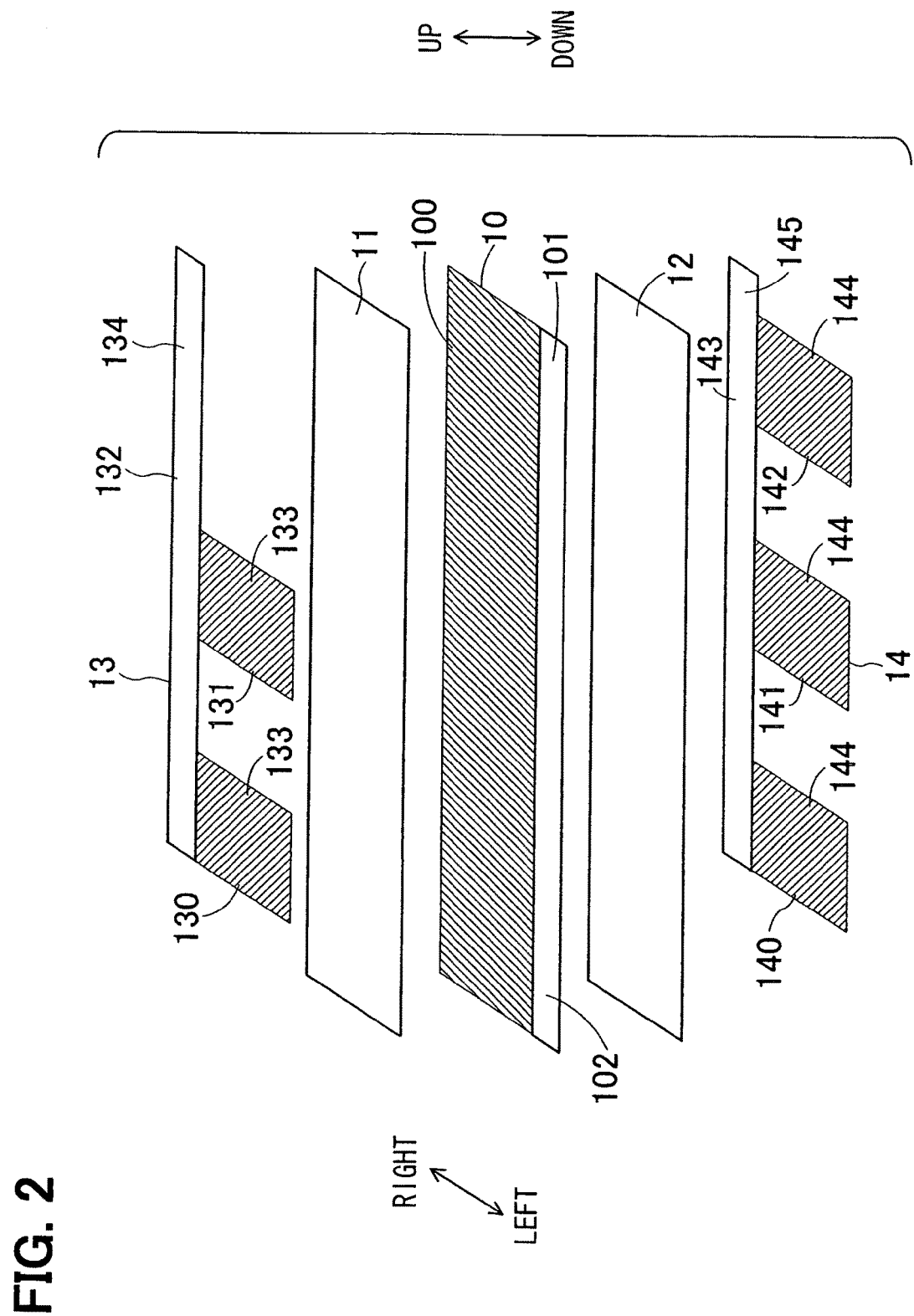
FIG. 2 is a diagram illustrating a stacked state of a negative electrode plate, separators, and a positive electrode plate in accordance with the embodiment.
Figure 3:
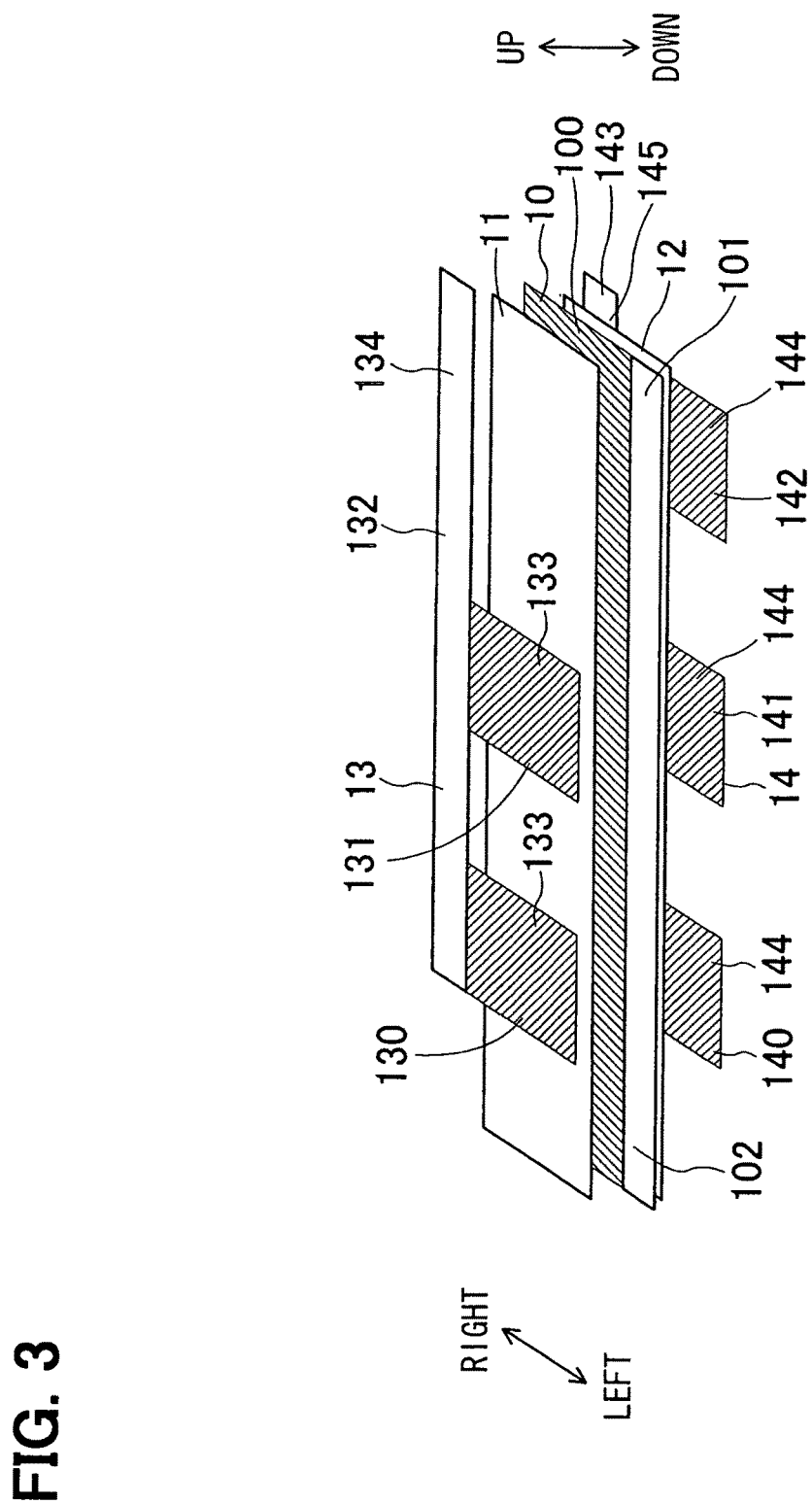
FIG. 3 is a diagram illustrating a stacked state of the negative electrode plate, the separators, and the positive electrode plate in accordance with the embodiment.

An electrode layered product 1 illustrated in FIG. 1 constitutes a cell that is disposed in a vehicle to supply electricity to an electronic device, for example. As illustrated in FIGS. 2 and 3, the electrode layered product 1 includes a negative electrode plate (first electrode plate) 10, a first separator 11, a second separator 12, and positive electrode plates 13 (second electrode plate) and 14 (third electrode plate).

The negative electrode plate 10 is a beltlike and foil-shaped member that constitutes a negative electrode and is made of copper. A negative electrode active material layer 100 (shadow area) including graphite and binder is formed on an upper surface (one surface) and a lower surface (the other surface) of the negative electrode plate 10, which are reversely located in its thickness direction. A beltlike edge part 101, in which the negative electrode active material layer 100 is not formed, is formed at a left end part of the plate 10. The edge part 101 is a region that is bent to constitute a negative electrode terminal part 102.

The first separator 11 is a microporous member made of polyethylene and having a beltlike and thin plate shape. The first separator 11 is stacked on an upper surface side (one surface side) of the negative electrode plate 10 to cover the negative electrode active material layer 100.

The second separator 12 is a microporous member made of polyethylene and having a beltlike and thin plate shape. The second separator 12 is stacked on a lower surface side (the other surface side) of the negative electrode plate 10 to cover the negative electrode active material layer 100.

The positive electrode plate 13 is a member having a pectinate and foil shape that constitutes a positive electrode and is made of aluminum. The positive electrode plate 13 includes tooth sections 130, 131 and a joining section 132. The tooth sections 130, 131 are regions having a rectangular shape that constitute the positive electrode. A positive electrode active material layer 133 (shadow area) containing lithium nickel oxide, a binder, and a conducting material is formed on upper and lower surfaces of the tooth sections 130, 131. The joining section 132 is a beltlike region that connects the tooth sections 130, 131 together at predetermined intervals on a right-hand side of the tooth sections 130, 131. The joining section 132 is also a region that is bent to constitute a positive pole terminal part 134. The positive electrode plate 13 is stacked on an upper surface side of the first separator 11 (opposite side of the separator 11 from the first electrode plate) such that the positive electrode active material layer 133 is covered with the first separator 11.

Similar to the positive electrode plate 13, the positive electrode plate 14 is a member having a pectinate and foil shape that constitutes a positive electrode and is made of aluminum. The positive electrode plate 14 includes tooth sections 140 to 142 and a joining section 143. The tooth sections 140 to 142 are regions having a rectangular shape that constitute the positive electrode. A positive electrode active material layer 144 containing lithium nickel oxide, a binder, and a conducting material is formed on upper and lower surfaces of the tooth sections 140 to 142. The joining section 143 is a beltlike member that connects the tooth sections 140 to 142 together at predetermined regular intervals on a right-hand side of the tooth sections 140 to 142. The joining section 143 is also a region that is bent to constitute a positive pole terminal part 145.

The positive electrode plate 14 is stacked on a lower surface side of the second separator 12 (opposite side of 12 from the first electrode plate) such that its tooth sections 140, 141 are opposed to the tooth sections 130, 131 of the positive electrode plate 13 in the up-down direction (stacking direction), and that its positive electrode active material layer 144 is covered with the second separator 12. In other words, the tooth sections 130, 131 of the positive electrode plate 13 are stacked to be opposed to the tooth sections 140, 141 of the positive electrode plate 14 in the up-down direction.

Figure 4:
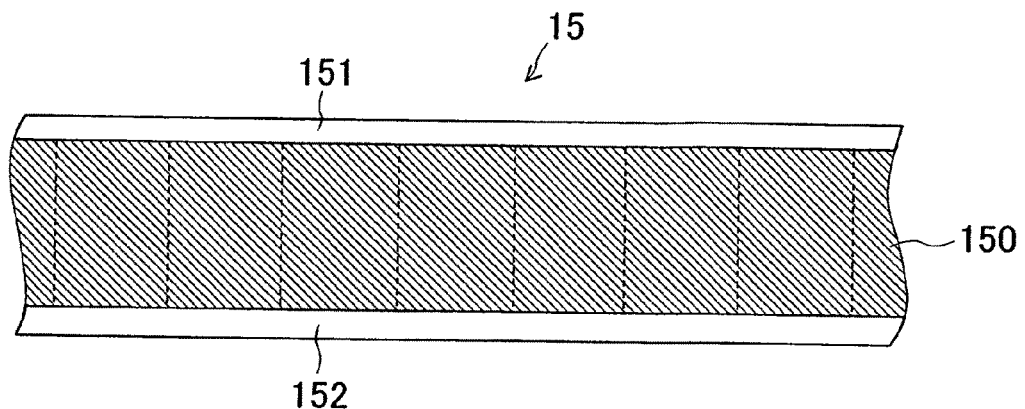
FIG. 4 is a diagram illustrating a forming process for the positive electrode plate in accordance with the embodiment.
Figure 5:
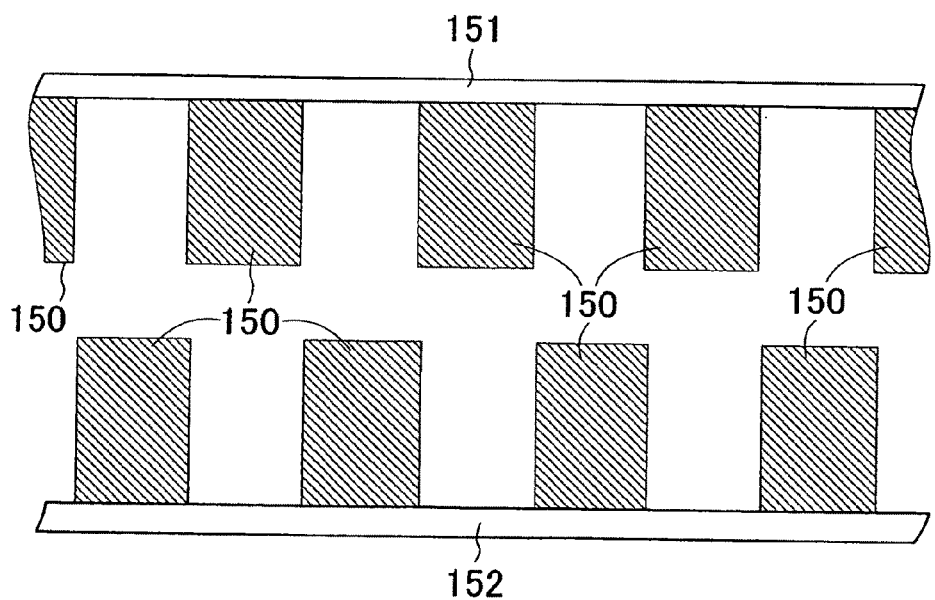
FIG. 5 is a diagram illustrating the forming process for the positive electrode plate in accordance with the embodiment.
Figure 6:
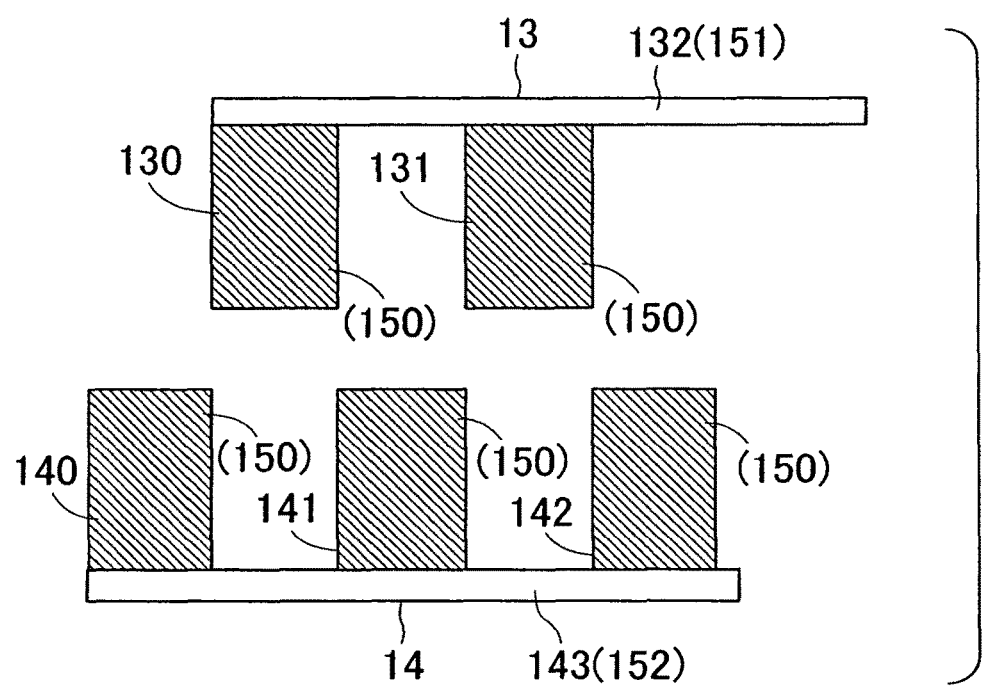
FIG. 6 is a plan view illustrating the positive electrode plates after their formation in accordance with the embodiment.

The positive electrode plates 13, 14 are simultaneously formed by cutting a beltlike electrode plate into a pectinate shape. As illustrated in FIG. 4, an electrode plate 15 is a beltlike and foil-shaped member made of aluminum. A positive electrode active material layer 150 (shadow area) containing lithium nickel oxide, a binder, and a conducting material is formed on front and rear surfaces of the electrode plate 15. Moreover, beltlike edge parts 151, 152, at which the positive electrode active material layer 150 is not formed, are formed at both ends of the plate 15 in its width direction. The region of this electrode plate 15, on which the positive electrode active material layer 150 is formed, is cut into a pectinate shape using a cutting-die roll as indicated by a short dashes line. Accordingly, as illustrated in FIG. 5, two pectinate electrode plates are configured at the same time. Then, as illustrated in FIG. 6, by cutting the pectinate electrode plates at their appropriate places in the longitudinal direction, the positive electrode plates 13, 14 are formed with the edge parts 151, 152 serving as the joining sections 132, 143; and with the rectangular regions, on which the positive electrode active material layer 150 is formed, functioning as the tooth sections 130, 131, 140 to 142.

Figures 7A, 7B, 7C:
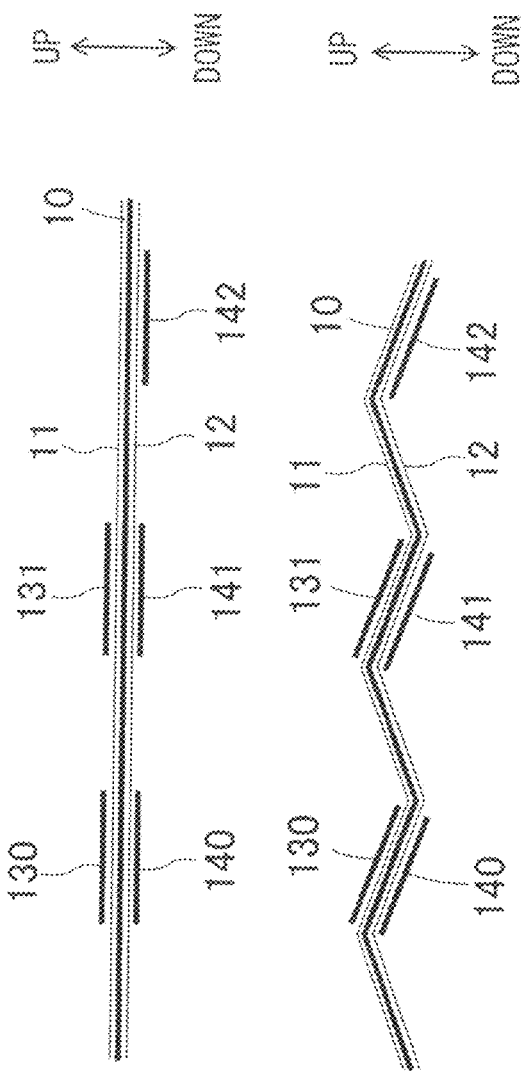
FIG. 7A is a diagram illustrating a process for bending formation of the negative electrode plate, the separators, and the positive electrode plates, which are stacked up, in accordance with the embodiment.
FIG. 7B is a diagram illustrating the process for bending formation of the negative electrode plate, the separators, and the positive electrode plates in accordance with the embodiment.
FIG. 7C is a diagram illustrating the process for bending formation of the negative electrode plate, the separators, and the positive electrode plates in accordance with the embodiment.

As illustrated in FIGS. 7A to 7C, the negative electrode plate 10, the first separator 11, the second separator 12, and the positive electrode plates 13, 14, which have been stacked up, are bent in a zigzag manner. More specifically, as illustrated in FIG. 7B, they are bent in a zigzag manner such that the tooth sections 130, 131 of the positive electrode plate 13, and the tooth sections 140 to 142 of the positive electrode plate 14, are located respectively between the negative electrode plate 10. Accordingly, the electrode layered product 1, in which the positive electrode plates 13, 14 and the negative electrode plate 10 are stacked alternately in the front-rear direction, is configured as illustrated in FIG. 7C. Specifically, the electrode layered product 1, in which the tooth sections 130, 131, 140 to 142 of the positive electrode plates 13, 14, and the negative electrode plate 10 are stacked alternately in the front-rear direction, is configured.

Effects of the layered product 1 according to the embodiment will be described. In the present embodiment, more than one electrode plate, which are conventionally arranged in the longitudinal direction, are integrated respectively as the negative electrode plate 10, and the positive electrode plates 13, 14. Therefore, more than one independent electrode plate do not need to be arranged in the longitudinal direction as in the previously existing technology. As a result, an operating time for configuring the product 1 can be shortened. Furthermore, electrode positions are restrained in the integrated configuration of the product 1. Accordingly, a position misalignment between the electrode plates is not easily caused. Thus, the operating time for the electrode layered product for the cell that is disposed in the vehicle to supply electricity to the electronic device can be shortened, so as to improve its productivity, and the position misalignment between the electrode plates in the electrode layered product can be limited.

In the present embodiment, as illustrated in FIGS. 7A to 7C, the tooth sections 130, 131 of the positive electrode plate 13 are stacked to be opposed to the tooth sections 140, 141 of the positive electrode plate 14 in the up-down direction. Accordingly, the product 1 can be bent in a zigzag manner such that the tooth sections 130, 131 of the positive electrode plate 13, and the tooth sections 140 to 142 of the positive electrode plate 14 are positioned respectively between the negative electrode plate 10. As a result, the electrode layered product 1, in which the negative electrode plate 10 and the positive electrode plates 13, 14 are alternately stacked, can be configured.

In the present embodiment, the positive electrode plates 13, 14 are formed simultaneously by cutting the beltlike electrode plate 15 into a pectinate shape. Consequently, the positive electrode plates 13, 14 can be configured efficiently.

In addition, in the present embodiment, the product 1 is configured with the beltlike negative electrode plate 10 serving as a negative electrode, and with the pectinate positive electrode plates 13, 14 serving as a positive electrode. Accordingly, a surface area of the negative electrode can be made larger than a surface area of the positive electrode. Normally, it is more desirable in ensuring performance of a cell that a surface area of its negative electrode should be larger than a surface area of its positive electrode. Therefore, sufficient performance of the cell can be secured.

Figure 8:
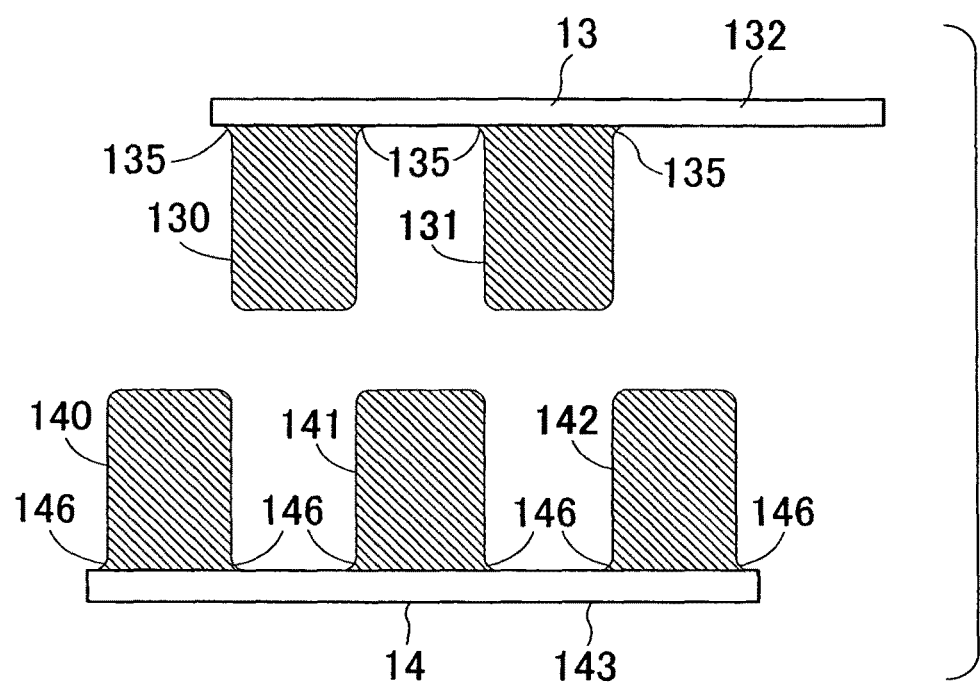
FIG. 8 is a plan view illustrating positive electrode plates after their formation in accordance with a modification.

In the present embodiment, as illustrated in FIG. 6, corner parts made between the tooth sections 130, 131, and the joining section 132 of the positive electrode plate 13; and corner parts made between the tooth sections 140 to 142, and the joining section 143 of the positive electrode plate 14, are right angles, as one example. However, these corner parts are not limited to the right angles. As illustrated in FIG. 8, corner parts 135 made between the tooth sections 130, 131, and the joining section 132; and corner parts 146 made between the tooth sections 140 to 142, and the joining section 143, may have a round shape. Accordingly, the corner parts 135, 146 of the positive electrode plates 13, 14 can be reinforced. Therefore, damages to the corner parts 135, 146 of the positive electrode plates 13, 14 at the time of transferring the product 1 and stacking the plates 13, 14, can be prevented.

Figure 9:
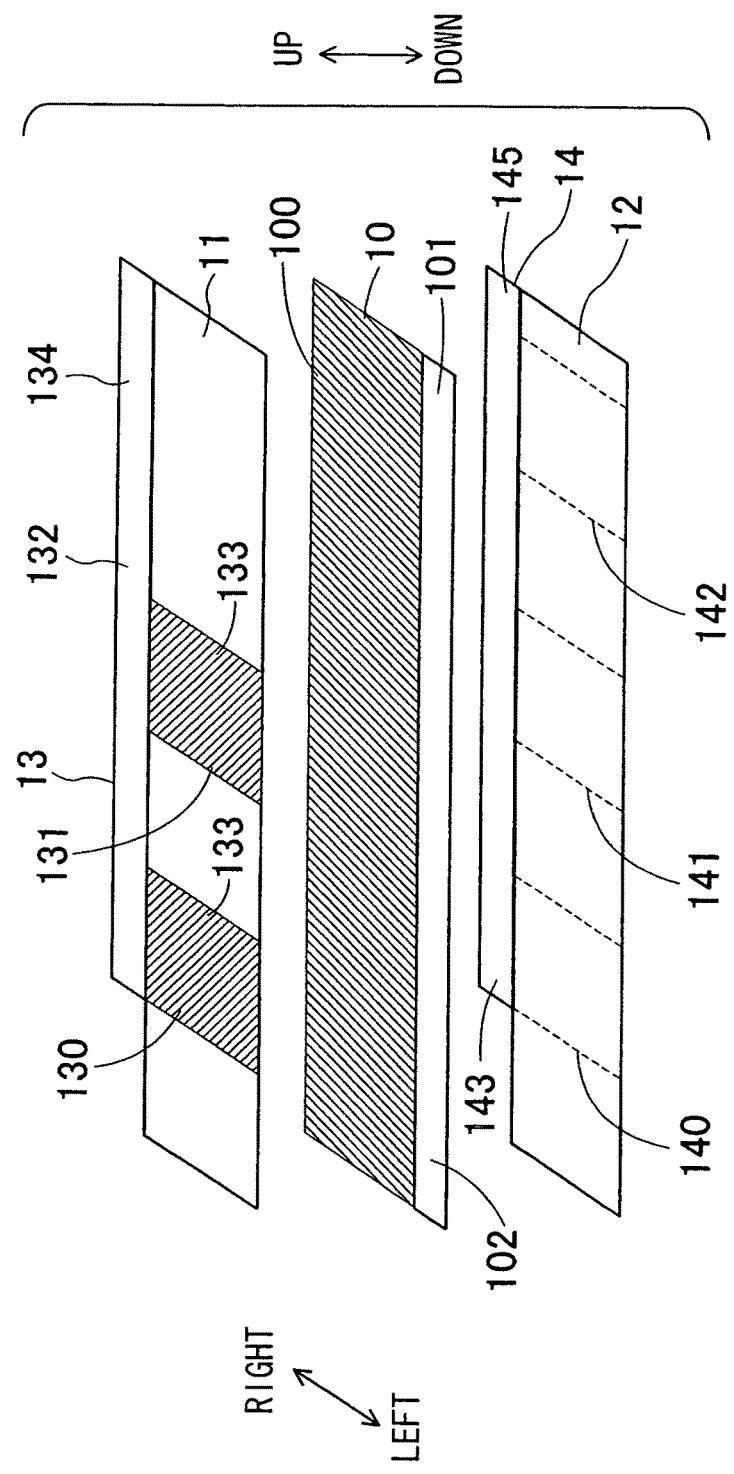
FIG. 9 is a diagram illustrating a stacked state of a negative electrode plate, separators, and a positive electrode plate in accordance with a modification.
Figure 10:
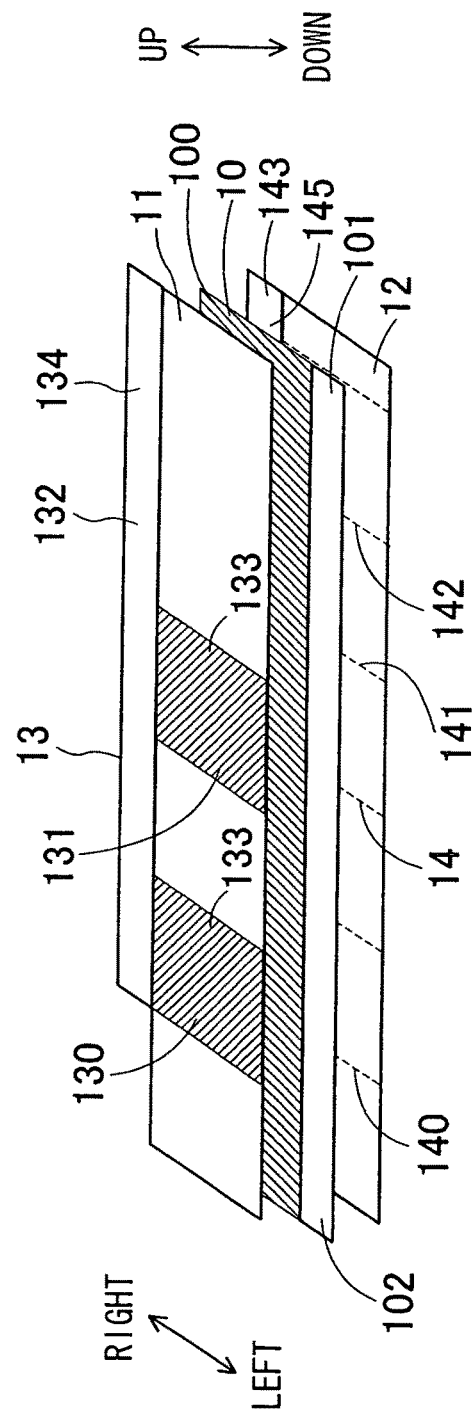
FIG. 10 is a diagram illustrating a stacked state of the negative electrode plate, the separators, and the positive electrode plate in accordance with the modification.

In the present embodiment, as illustrated in FIGS. 2 and 3, the negative electrode plate 10, the first separator 11, the second separator 12, and the positive electrode plates 13, 14 are stacked independently as one example. However, they may not necessarily be stacked independently. As illustrated in FIGS. 9 and 10, the positive electrode plate 13 may be stacked on the upper surface side of the negative electrode plate 10 with the plate 13 fixed on the first separator 11; and the positive electrode plate 14 may be stacked on the lower surface side of the negative electrode plate 10 with the plate 14 fixed on the second separator 12. Accordingly, the positive electrode plate 13 can be reinforced with the first separator 11. In addition, the positive electrode plate 14 can be reinforced with the second separator 12. Thus, damages to the positive electrode plates 13, 14 at the time of stacking the plates 13, 14 can be prevented. Furthermore, position misalignment of the positive electrode plates 13, 14 at the time of stacking and bending the plates 13, 14 can be limited.

Figure 11A:
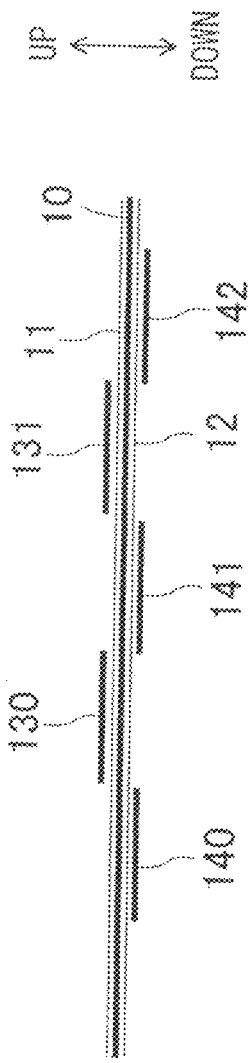
FIG. 11A is a diagram illustrating a process for bending formation of a negative electrode plate, separators, and positive electrode plates, which are stacked up, in accordance with a modification.
Figure 11B:
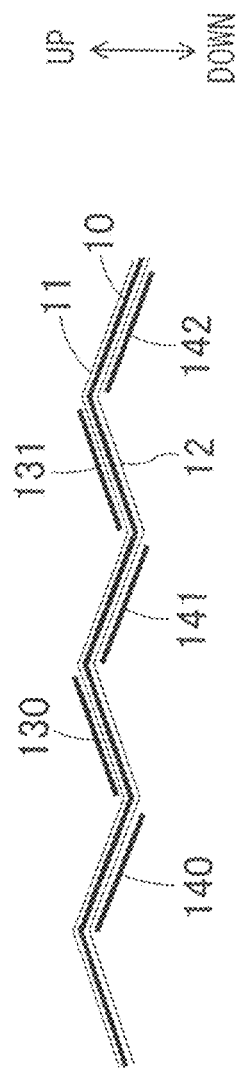
FIG. 11B is a diagram illustrating the process for bending formation of the negative electrode plate, the separators, and the positive electrode plates in accordance with the modification.
Figure 11C:
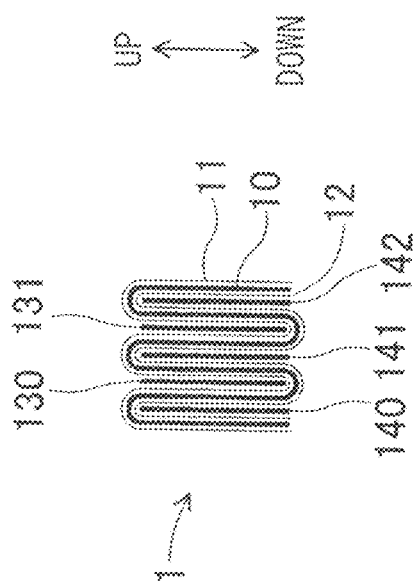
FIG. 11C is a diagram illustrating the process for bending formation of the negative electrode plate, the separators, and the positive electrode plates in accordance with the modification.

In the present embodiment, as illustrated in FIGS. 7A to 7C, the plate 10, the separators 11, 12, and the plates 13, 14 are bent in a zigzag manner in a stacked state such that the tooth sections 130, 131 of the positive electrode plate 13 are opposed to the tooth sections 140, 141 of the positive electrode plate 14 in the up-down direction, as one example. However, they are not necessarily bent in the above-described manner. As illustrated in FIGS. 11A to 11C, the plate 10, the separators 11, 12, and the plates 13, 14 may be bent in a zigzag manner with the tooth sections 130 and 131 of the positive electrode plate 13 disposed and stacked respectively between the tooth sections 140 and 141 of the positive electrode plate 14; and between the tooth sections 141 and 142 of the plate 14. In this case as well, the product 1 can be bent such that the tooth sections 130, 131 of the positive electrode plate 13, and the tooth sections 140 to 142 of the positive electrode plate 14 are positioned respectively between the negative electrode plate 10.

Additional advantages and modifications will readily occur to those skilled in the art. The invention in its broader terms is therefore not limited to the specific details, representative apparatus, and illustrative examples shown and described.

What is claimed is:

1. An electrode layered product for a cell, comprising:
a first electrode plate that has a shape of a strip and includes an active material layer formed on a first surface and a second surface of the first electrode plate, the first surface and the second surface of the first electrode plate are on opposite sides of the first electrode plate in a thickness direction of the first electrode plate, and the active material continuously extends along a longitudinal direction of the shape of the strip;
a first separator that has a shape of a strip and is stacked on the first surface of the first electrode plate;
a second separator that has a shape of a strip and is stacked on the second surface of the first electrode plate;
a second electrode plate that has a pectinate, tooth shape and is stacked on an opposite side of the first separator from the first electrode plate, wherein the second electrode plate includes:
a plurality of first tooth sections that are adjacent to each other with intervals therebetween;
a first joining section that joins together the plurality of first tooth sections at end portions of the plurality of the first tooth sections wherein the plurality of first tooth sections and the first joining section are configured as a single piece; and an active material layer that is formed on a first surface and a second surface of each of the plurality of first tooth sections, the first surface and the second surface of the first tooth section are on opposite sides of the first tooth section in a thickness direction of the first tooth section; and a third electrode plate that has a pectinate, tooth shape and is stacked on an opposite side of the second separator from the first electrode plate, wherein:

the third electrode plate includes:

a plurality of second tooth sections that are adjacent to each other with intervals therebetween;

a second joining section that joins together the plurality of second tooth sections at end portions of the plurality of second tooth sections wherein the plurality of second tooth sections and the second joining section are configured as a single piece; and an active material layer that is formed on a first surface and a second surface of each of the plurality of second tooth sections, the first surface and the second surface of the second tooth section are on opposite sides of the second tooth section of the third electrode in a thickness direction of the second tooth section, wherein all of the first electrode plate, the first separator, the second separator, the second electrode plate, and the third electrode plate, which are stacked together, are bent in a zigzag manner by folding them back alternately from side to side, and a pitch of the plurality of first tooth sections of the second electrode plate and a pitch of the plurality of second tooth sections of the third electrode plate are shifted from each other by their width length along the longitudinal direction of the shape of the strip of the first electrode plate.

2. The electrode layered product according to claim 1, wherein the first electrode plate, the first separator, the second electrode plate, and the third electrode plate are bent in the zigzag manner such that the plurality of first tooth sections of the second electrode plate and the plurality of second tooth sections of the third electrode plate are positioned respectively between the first electrode plate.

3. The electrode layered product according to claim 1, wherein the first electrode plate, the first separator, the second separator, the second electrode plate, and the third electrode plate are bent in the zigzag manner with the plurality of first tooth sections of the second electrode plate respectively opposed to the plurality of second tooth sections of the third electrode plate in a stacking direction.

4. The electrode layered product according to claim 1, wherein the first electrode plate, the first separator, the second separator, the second electrode plate, and the third electrode plate are bent in the zigzag manner with each of the plurality of first tooth sections of the second electrode plate arranged between corresponding adjacent two of the plurality of second tooth sections of the third electrode plate in a direction perpendicular to a stacking direction.

5. The electrode layered product according to claim 1, wherein:

the second electrode plate further includes a plurality of first corner parts that are respectively formed between the plurality of first tooth sections and the first joining section of the second electrode plate;

each of the plurality of first corner parts of the second electrode plate has a round shape;

the third electrode plate further includes a plurality of second corner parts that are respectively formed between the plurality of second tooth sections and the second joining section of the third electrode plate; and each of the plurality of second corner parts of the third electrode plate has a round shape.

6. The electrode layered product according to claim 1, wherein:

the first separator is stacked on the first surface of the first electrode plate with the second electrode plate fixed on the first separator; and the second separator is stacked on the second surface of the first electrode plate with the third electrode plate fixed on the second separator.

7. The electrode layered product according to claim 1, wherein the second electrode plate and the third electrode plate are formed simultaneously from a strip-shaped electrode plate in a pectinate, tooth-shaped manner.

8. The electrode layered product according to claim 1, wherein:

the first electrode plate serves as a negative electrode; and the second electrode plate and the third electrode plate serve as a positive electrode.

9. The electrode layered product according to claim 1, wherein the product is disposed in a vehicle to supply electricity to an electronic device.

10. An electrode layered product comprising:

a first electrode plate having a strip shape and including an active material layer formed on a first surface and a second surface of the first electrode plate, wherein the first surface and the second surface of the first electrode plate are on opposite sides of the first electrode plate, and the active material continuously extends along a longitudinal axis of the first electrode plate;

a first separator having a strip shape and disposed along the first surface of the first electrode plate;

a second separator having a strip shape and disposed along the second surface of the first electrode plate;

a second electrode plate including a plurality of first tooth sections disposed adjacent to each other with a first predetermined interval disposed therebetween and a first joining section coupling the plurality of first tooth sections at an end portion of the plurality of first tooth sections, wherein the plurality of first tooth sections and the first joining section are configured as a single piece and the second electrode is disposed along the first separator on a side opposite of the first electrode plate, and a third electrode plate including a plurality of second tooth sections disposed adjacent to each other with a second predetermined interval disposed therebetween and a second joining section couples the plurality of second tooth sections at an end portion of the plurality of second tooth sections, wherein the plurality of second tooth sections and the second joining section are configured as a single piece and the third electrode is disposed along the second separator on a side of the second separator opposite of the first electrode plate, wherein all of the first electrode plate, the first separator, the second separator, the second electrode plate, and the third electrode plate are bent in a zigzag manner by folding them back alternately from side to side.

11. An electrode layered product for a cell, comprising:

a first electrode plate that has a shape of a strip and includes an active material layer formed on a first surface and a second surface of the first electrode plate, the first surface and the second surface of the first electrode plate are on opposite sides of the first electrode plate in a thickness direction of the first electrode plate, and the active material continuously extends along a longitudinal direction of the shape of the strip;

a first separator that has a shape of a strip and is stacked on the first surface of the first electrode plate;

a second separator that has a shape of a strip and is stacked on the second surface of the first electrode plate;

a second electrode plate that has a pectinate, tooth shape and is stacked on an opposite side of the first separator from the first electrode plate, wherein the second electrode plate includes:

a plurality of first tooth sections that are adjacent to each other with intervals therebetween; and a first joining section that joins together the plurality of first tooth sections at end portions of the plurality of the first tooth sections wherein the plurality of first tooth sections and the first joining section are configured as a single piece; and an active material layer that is formed on a first surface and a second surface of each of the plurality of first tooth sections, the first surface and the second surface of the first tooth section are on opposite sides of the first tooth section in a thickness direction of the first tooth section; and a third electrode plate that has a pectinate, tooth shape and is stacked on an opposite side of the second separator from the first electrode plate, wherein:

the third electrode plate includes:

a plurality of second tooth sections that are adjacent to each other with intervals therebetween;

a second joining section that joins together the plurality of second tooth sections at end portions of the plurality of second tooth sections wherein the plurality of second tooth sections and the second joining section are configured as a single piece; and an active material layer that is formed on a first surface and a second surface of each of the plurality of second tooth sections, the first surface and the second surface of the second tooth section are on opposite sides of the second tooth section of the third electrode in a thickness direction of the second tooth section, wherein the first electrode plate, the first separator, the second separator, the second electrode plate, and the third electrode plate, which are stacked together, are bent in a zigzag manner.

12. The electrode layered product according to claim 11, wherein a surface of the first joining section is coplanar with the first surface of each of the plurality of first tooth sections.

13. The electrode layered product according to claim 11, wherein in the zigzag manner, the electrode layered product includes the first separator, the first electrode plate, the second separator, the third electrode plate, the second separator, the first electrode plate, the first separator and the second electrode plate in this order in a stacked direction of the zigzag manner.

14. The electrode layered product according to claim 11, wherein a pitch of the plurality of first tooth sections of the second electrode plate and a pitch of the plurality of second tooth sections of the third electrode plate are shifted from each other by their width length along the longitudinal direction of the shape of the strip of the first electrode plate.

* * * * *